United States Patent Office 3,525,607
Patented Aug. 25, 1970

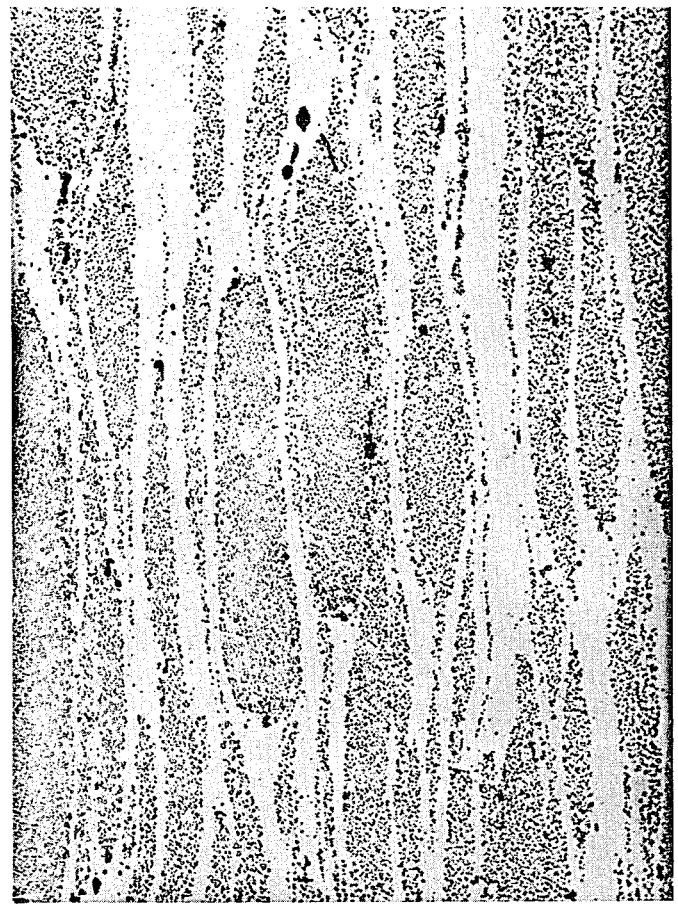
INVENTOR.
FREDERICK C. HOLTZ, JR.

3,525,607
ALLOY SYSTEMS AND PROCESS FOR THE MANUFACTURE THEREOF
Frederick C. Holtz, Jr., Evanston, Ill., assignor to IIT Research Institute, Chicago, Ill., a not-for-profit corporation of Illinois
Continuation-in-part of application Ser. No. 435,733, Feb. 26, 1965. This application Jan. 3, 1966, Ser. No. 518,162
Int. Cl. B22f 3/12; C22c 19/00, 39/14
U.S. Cl. 75—123                    4 Claims

ABSTRACT OF THE DISCLOSURE

Compositionally and structurally novel composite alloys consisting of a continuous matrix of a relatively tough and relatively ductile, metal, tool alloy or structural alloy, and a principal dispersed discontinuous constituent consisting of a high carbide volume tool material, are produced by blending from about 10 to 40 volume percent of the powdered continuous matrix constituent with from about 60 to 90 volume percent of the atomized, pre-alloyed powder which forms the principal high carbide, dispersed, discontinuous constituent, and subjecting the blended powders to the step of hot consolidation to produce a fully dense composite alloy system.

---

This patent application is a continuation-in-part of application Ser. No. 435,733 filed Feb. 26, 1965 by the same inventor.

The present invention relates to a new group of complex alloy systems and to the process of the manufacture thereof and more especially relates to compositionally and structurally novel composite alloys which illustrate property and processing advantages over known alloy systems.

The present materials may be characterized by what is termed "duplex" features and preferably consist of a continuous matrix of, for example, a tough tool or structural alloy and a principal dispersed, discontinuous constituent which preferably consists of a high or very high carbide volume tool material. By combining these two general types of materials, I have been readily able to fabricate alloy systems of desirable hardness and a toughness combinations which, for example, have excellent utility as tool materials, although certainly they can be used for other purposes and I am quite certain that those skilled in this art will quickly appreciate their utility. It will subsequently be shown that by the practice taught herein, the incorporation of the tough continuous matrix renders the composite material to be more readily fabricated than the harder principal discontinuous constituent, while virtually no loss of hardness occurs and an increase in strength is obtained. compared to the hardness and strength of the principal constituent (as fabricated without the addition of the tough continuous matrix).

Accordingly, a primary object of my invention is to provide a novel duplex alloy system consisting essentially of a continuous matrix of a tough metallic constituent and a relatively harder dispersed, discontinuous constituent and wherein preferably there is a relatively greater volume of dispersed constituent than continuous matrix.

Another object of my invention is to provide a novel method of making and fabricating such alloys systems which involves in the preferred embodiment hereof the steps of atomizing melts of said alloying constituents to form powders, especially atomizing the principal constituent, and subsequently blending and consolidating such powders.

These and other objects, features and advantages of my invention will become apparent to those skilled in this particular art from the following detailed disclosure thereof and the accompanying photomicrograph which discloses the microstructure of one of the present alloy systtems, said photomicrograph being at a magnification of 500×.

The dispersed phase of the present alloy system should be a relatively hard material, i.e., harder than the continuous phase which in the final product surrounds the hard phase particles and in the absolute terms relatively hard. I have achieved good results with dispersed phase materials which consist of ferrous base alloys preferably enriched with large carbide volumes and wherein the carbide phase thereof is of a very fine size (predominantly less than 3 microns) and substantially uniformly distributed throughout the ferrous matrix. It should of course be understood that the dispersed particles are not limited to ferrous base materials and the hardening thereof may be provided by means other than carbide formation and/or large carbide volume. The dispersed particles can consist of non-ferrous compositions and the hardening thereof may be either by carbide volume or by other mechanisms and compositions. Generally speaking, the dispersed particles are characterized by being essentially hard, brittle types of alloys of various base materials selected from the group iron, cobalt, nickel, a cobalt-tungsten carbide composite, tungsten, chromium, aluminum, copper and other alloy systems characterized as aforesaid.

In the preferred embodiment hereof the dispersed particles are produced by a molten metal atomization technique and especially for the iron, cobalt, nickel and cobalt-tungsten carbide systems, hardening thereof primarily is a result of the high volume, fine size, uniformly distributed carbide phase present therein.

Some of the particulate metal systems which comprise the dispersed phase of the present structures are described and claimed in my co-pending applications and the two pending applications of N. M. Parikh all of which are assigned to the assignee of the present application, the disclosure of all of said pending applications being incorporated by reference. These are application Ser. No. 518,058 entitled "Novel Alloys and Process," application Ser. No. 518,181 entitled "Novel Alloys and Process," application Ser. No. 518,098 entitled "Cobalt-Tungsten Carbide Alloy and Process," application Ser. No. 518,145 entitled "Nickel Base Alloys and Process for Their Manufacture," and 518,442 entitled "Nickel Base Alloys and Process for the Manufacture Thereof," each filed Jan. 3, 1966 by the present inventor, and application Ser. No. 518,130 entitled "Stainless Steels and Process for Their Manufacture," and application Ser. No. 518,165 entiled "Nickel, Base Alloys and Process for Their Manufacture," each filed Jan. 3, 1966 by Niranjan M. Parikh.

The continuous matrix phase of the present alloy systems is preferably selected from the same major metal base as the dispersed particles but such phase is characterized by a lower hardness and higher toughness, strength and a ductility than the dispersed phase. After consolidation, such dispersed phase exists substantially continuously around the dispersed phase particles, does not interact with the particles to form undesirable, for example, embrittling compounds and furthermore the dispersed particles and the continuous phase must be fabricable at such temperature and for such times whereby any diffusion between the two is not excessive. However, a small degree of diffusion may be desirable to promote the bonding between the particles and continuous phase for such minimal diffusion produces a gradual gradation of hard phase content across the interface between the two phases.

The present materials are made by blending followed by hot consolidation of powders of the two constituents. I have used inert-gas atomization of 5-pound melts to produce powders of the hard, wear-resistant principal dispersed, discontinuous constituent. This technique has been described in my co-pending applications, the serial numbers of which will be identified subsequently.

Powders produced by this method are characterized by high carbide volumes which, upon subsequent hot working, exist as a fine, uniform dispersion, usually 3 microns or less in size. While atomization has been used to produce powders of the principal constituent, other powder producing techniques which will yield a similar product— i.e., a hard, wear resistant material characterized by a large volume of fine, uniformly dispersed hard phase— may also be used. As an example, cemented carbides such as WC—Co, WC—TiC—Co, or related liquid-phase sintered tool alloy systems, may be crushed by mechanical means to powder form to fulfill the requirements of the principal, dispersed constituent.

To the powders of the principal dispersed constituent are added powders of the continuous matrix constituent. I have found that about 25 volume percent of the continuous matrix constituent imparts good fabricability, strength, and toughness to the composite product, but obviously if greater toughness is desired the volume percent of the matrix should be increased, and if greater wear resistance is required, the volume percent of the matrix should be decreased. Thus, depending upon the particular application, the matrix constituent could vary from 10 to 40 volume percent while maintaining the desirable features of my invention.

The powders of the continuous matrix constituent have been made by the aforementioned metal atomization process and also by the reduction of iron oxide by hydrogen, and by the mixture of iron powder with finely divided carbides, as will be shown in the list of materials which I have prepared. While these methods yielded the desirable types of continuous matrix alloy powders, other well known powder producing methods may also be employed to yield powders which fulfill the requirements of the continuous matrix phase—i.e., relatively low carbide volume and hardness, but relatively high strength and toughness. Examples of other such powder producing methods include reduction of single or mixed oxides, carbonyl powders, or powders prepared by comminution of metal or alloy stock.

Having added the appropriate volume of powders which will form the continuous matrix constituent to the powders which will form the principal dispersed, discontinuous constituent, the powders are then blended by tumbling, ball milling, jar-blending, or other suitable mixing method which will insure that the constituent powders are thoroughly mixed and homogeneous. The powders I have used were predominantly minus 80 mesh in particle size, but coarser powders (up to at least ⅛ inch diameter) can readily be substituted. The mixed powders are then consolidated into substantially fully dense stock by hot working. I have produced such stock by sealing the powder mixture into Inconel cans, then forging and hot rolling the cans until subsequently all porosity is eliminated. Alternative powder working methods such as hot-pressing or powder extrusion may also be used to accomplish the same results without departing from the scope of my invention.

During consolidation, the powders of the softer matrix constituent are readily plastically deformed at the hot working temperatures which typically are those used for forging or hot working said matrix constituent—i.e. in the range of 1850° to 2200° F. if the matrix constituent is a mild steel, a die steel, a high-speed steel, or a nickel or cobalt-base "superalloy," for example. The particles of the principal dispersed, discontinuous constituent may also exhibit a degree of plastic deformation during hot working of the composite body, depending upon the temperature used. FIG. 1 illustrates Alloy No. A18, which contains 30 wt. percent hydrogen reduced iron powder and 70 wt. percent of the composition Fe–18W–4Cr–6V–1.8C (the latter constituent prepared by atomization and identified as alloy A12 in my co-pending application Ser. No. 435,733). This illustration at 500 magnifications shows the continuous nature of the tough iron matrix (the elongated light areas) and the discontinuous nature of the alloy A12 particles (the elongated darker areas which contain fine carbides) which have become elongated during hot working at 2150° F. The hardness of this composite material after quenching from 2250° F. was Rc 67, the same hardness which was obtained upon alloy A12 when consolidated without the tough iron matrix.

While the structure illustrated in FIG. 1 shows severe deformation of the principal dispersed, discontinuous constituent which could produce undesirable directional properties, I have also produced wrought composite bodies wherein the principal dispersed particles retained their original spheroidal shape. This was accomplished by hot working the blended powders at temperatures at which the matrix particles were readily deformed while at the same time the powders of the principal dispersed constituent had sufficient strength to resist plastic deformation.

Table I lists a number of "duplex"-type composite materials which I have prepared by blending the constituent powders, canning the blended powders in "Inconel," then forging and hot rolling the canned powder billets to reductions in height of at least 90 percent.

TABLE I.—ALLOY COMPOSITIONS

| Alloy No. | Composition, weight percent* |
|---|---|
| 18 | 30% Fe, hydrogen reduced powders (matrix); 70% Fe-18W-4Cr-6V-1.8C (dispersed phase). |
| 19 | 15% Fe, hydrogen reduced powders (matrix); 10% VC, 1-micron commercial powder (matrix); 75% Fe-18W-4Cr-6V-1.8C (dispersed phase). |
| 53 | 25% Fe-1.5Mo-5Cr-1V-0.35C** (matrix); 75% Fe-6.5W-4Mo-4.5Cr-5Co-10V-2.75C (dispersed phase). |
| 54 | 25% Fe-1.5Mo-5Cr-1V-0.35C** (matrix); 75% Fe-6.5W-4Mo-4.5Cr-5Co-10V-3.4C (dispersed phase). |
| 55 | 25% Fe-1.5Mo-5Cr-1V-0.3 C** (matrix); 75% Fe-8W-5Mo-12Cr-15Co-7V-2.5C (dispersed phase). |
| 56 | 25% Fe-1.5Mo-5Cr-1V-0.35C** (matrix); 75% Co-35Cr-17.5W-2.5C (dispersed phase). |
| 57 | 25% Fe-1.5Mo-5Cr-1V-0.35C** (matrix); 75% Fe-27Co-20Cr-9W-6Mo-3C (dispersed phase). |
| 58 | 25% Fe-6W-5Mo-4Cr-2V-0.8C*** (matrix); 75% Fe-6.5W-4Mo-4.5Cr-5Co-10V-2.75C (dispersed phase). |
| 59 | 25% Fe-6W-5Mo-4Cr-2V-0.8C*** (matrix); 75% Fe-8W-9Mo-6.5Cr-18Co-3.5V-1.8C (dispersed phase). |
| 60 | 25% Fe-6W-5Mo-4Cr-2V-0.8C*** (matrix); 75% Co-35Cr-17.5W-2.5C (dispersed phase). |
| 61 | 25% Fe-6W-5Mo-4Cr-2V-0.8C*** (matrix); 75% Fe-27Co-20Cr-9W-6Mo-3C (dispersed phase). |
| 63 | 25% Fe-1.5Mo-5Cr-1V-0.35C** (matrix); 75% Co-35Cr-10W-7.5Mo-2.5C (dispersed phase). |
| 64 | 25% Fe-6W-5Mo-4Cr-2V-0.8C*** (matrix); 75% Co-35Cr-10W-7.5Mo-2.5C (dispersed phase). |
| 65 | 35% 50 Co-47W-3C (matrix); 65% Co-35Cr-10W-7.5Mo-2.5C (dispersed phase). |
| 84 | 25% Udimet 700 (commercial Ni-base superalloy matrix); 75% Co-16Cr-44W-2.75C (dispersed phase). |
| 85 | 25% Inco 713-C (commercial Ni-base superalloy matrix); 75% Co-16Cr-44W-2.75C (dispersed phase). |

These materials represent a wide range of matrix-principal dispersed constituent combinations, i.e. iron-base matrix with iron or cobalt base principal constituent; nickel-base matrix with cobalt-base principal constituent; cobalt-base matrix with cobalt-base principal constituent, etc. I have found that it is preferable, but not alway necessary, to use the same alloy base for both the matrix and the principal constituent, that is, an iron-base matrix such as a die steel is to be preferred as the continuous phase when the principal dispersed constituent is a highly-alloyed iron-base material. However, a nickel-base matrix such as Udimet 700 may be used with principal dispersed constituents which are cobalt-base. Proper selection of matrix-principal constituent combinations is based upon compatibility between the two constituent powders. It is desirable to select combinations wherein no embrittling intermetallic compounds are formed at the interface between the two constituents when the mixed powders are heated for consolidation. In the case of a nickel-base alloy matrix in combination with the cobalt-base principal dispersed constituent, no embrittling reaction compounds were formed. On the other hand, some undesirable reaction products were formed during the consolidation of alloy A60 which contained an M2 high-speed steel matrix in combination with a highly alloyed cobalt-base tool material as the principal dispersed phase.

Some examples of the improvements obtained by the practices taught herein are set forth below:

Alloy 36 to be identified (Fe-27Co-20Cr-9W-6Mo-3C), when consolidated without the addition of a tough matrix had a transverse-rupture strength of 213,000 p.s.i. When the same alloy 36 contained 35 wt. percent of a matrix of H13 die steel (identified as Alloy No. 57 in Table I), the strength increased to 295,000 p.s.i., with virtually no change in hardness. The "duplex" material was also more readily fabricable.

Such Alloy 36, when used as a cutting tool for the lathe-turning of AISI 4340 bar stock, Rc 40 hardness, had a tool life of 9 min. at a cutting speed of 90 f.p.m. When this Alloy 36 contained the H13 die steel matrix, made according to the practice taught herein and identified as Alloy A57 in Table I, the tool life when cutting a similar workpiece material at 93 f.p.m. was approximately 10 min. But even more importantly, the tool wear was more uniform due to the absence of chipping as was observed when the relatively more brittle Alloy 36 was tested.

A further advantage of the alloys which are the subject of my invention is that they can be hot worked at temperatures somewhat lower than those which would be required to consolidate only the alloy which makes up the principal constituent. This reduction in hot working temperature is made possible because the continuous matrix constituent, by virtue of its reduced hard-phase—i.e. carbide—content is more readily plastically deformed.

A further advantage of the present composite alloys is that the thermal and electrical conductivities thereof, may be controlled and varied by the selection of the appropriate matrix material. Since the matrix is continuous, as compared with the isolated, dispersed constituent, the former governs to a large extent such conductivity properties of the composite. Accordingly, for example, a copper matrix in combination with a hard, wear resistant, dispersed constituent can offer excellent potential as an electrical contact material. Similarly, aluminum can be so used.

While the matrix and principal dispersed constituents listed in Table I are based on tool, die, or structural alloys of iron, nickel, and/or cobalt, it is obvious to those skilled in the art of powder metallurgy that other alloy systems such as aluminum, copper, tungsten, chromium, etc., may be employed advantageously as matrix-dispersed constituent combinations.

It will be understood that various modifications and variations may be effected without departing from the spirit or scope of the novel concepts of my invention.

I claim as my invention:

1. A composite alloy consisting essentially of: a continuous matrix constituent selected from the group consisting of iron-base, cobalt-base and nickel-base alloys and a dispersed, discontinuous constituent selected from the same group; said continuous matrix constituent being present in amounts ranging from 10 to 40 volume percent; said continuous matrix constituent being characterized by relatively greater toughness and ductility than said dispersed, discontinuous constituent; said dispersed, discontinuous constituent being characterized by relatively greater hardness and wear resistance than said continuous matrix constituent and being further characterized by containing a relatively larger volume of a fine, substantially uniformly dispersed, hard phase; both said constituents being so selected as to not form undesirable compounds upon hot consolidation thereof.

2. The alloy as defined in claim 1 wherein the fine, substantially uniformly dispersed hard phase in said discontinuous constituent is a carbide phase predominantly less than 3 microns.

3. The alloy as defined in claim 1 wherein the continuous matrix constituent has a carbon content ranging from 0 to 3% and the dispersed, discontinuous constituent has a carbon content ranging from 0.6% to 4%.

4. The process of making a composite, substantially fully dense, alloy as defined in claim 1 comprising the steps of blending powders of the named constituents and hot consolidating said powders.

References Cited

UNITED STATES PATENTS

| | | | |
|---|---|---|---|
| 3,244,506 | 4/1966 | Reen | 75—0.5 |
| 3,320,056 | 5/1967 | Stoops | 75—204 |

L. DEWAYNE RUTLEDGE, Primary Examiner

W. W. STALLARD, Assistant Examiner

U.S. Cl. X.R.

29—182.7; 75—0.5, 170, 171, 203